(12) United States Patent
Rizzo

(10) Patent No.: US 11,210,668 B2
(45) Date of Patent: Dec. 28, 2021

(54) PROCESS FOR CARRYING OUT TRANSACTIONS

(71) Applicant: PGMR ITALIA S.R.L., Milan (IT)

(72) Inventor: Andrea Rizzo, Milan (IT)

(73) Assignee: PGMR ITALIA S.R.L., Milan (IT)

( * ) Notice: Subject to any disclaimer, the term of this patent is extended or adjusted under 35 U.S.C. 154(b) by 11 days.

(21) Appl. No.: 16/964,329

(22) PCT Filed: Jan. 23, 2019

(86) PCT No.: PCT/IB2019/050559
§ 371 (c)(1),
(2) Date: Jul. 23, 2020

(87) PCT Pub. No.: WO2019/145868
PCT Pub. Date: Aug. 1, 2019

(65) Prior Publication Data
US 2021/0042750 A1 Feb. 11, 2021

(30) Foreign Application Priority Data
Jan. 23, 2018 (IT) .................. 102018000001687

(51) Int. Cl.
*G06Q 20/40* (2012.01)
*G06Q 20/20* (2012.01)
(Continued)

(52) U.S. Cl.
CPC ............ *G06Q 20/40* (2013.01); *G06Q 20/20* (2013.01); *G06Q 20/342* (2013.01); *G06Q 20/385* (2013.01); *G06Q 20/38215* (2013.01)

(58) Field of Classification Search
USPC ...................................... 705/35, 44
See application file for complete search history.

(56) References Cited

U.S. PATENT DOCUMENTS

2003/0187787 A1 10/2003 Freund
2012/0055996 A1 3/2012 Hamedani et al.
(Continued)

FOREIGN PATENT DOCUMENTS

WO 2012/126061 A1 9/2012
WO WO-2012126061 A1 * 9/2012 ............. G06Q 30/06
WO 2013/177286 A1 11/2013

OTHER PUBLICATIONS

Towards An Interoperable Mobile Wallet Service Pradipta Det, Kuntal Dey, Vinod Mank:ar, Sougata Mukherjea pradipta.de@sunykorea.ac.kr, {kuntadey,vinomank,smukherj}@in.ibm.com IBM Research, New Delhi, India (Year: 2013).*
(Continued)

*Primary Examiner* — William E Rankins
(74) *Attorney, Agent, or Firm* — Lucas & Mercanti, LLP

(57) ABSTRACT

The invention concerns a process for carrying out transactions which includes issuing electronic tokens marked by a first unique identification code and a monetary value, assigning electronic tokens having a reference code associated with the consumer addressee stored inside to a consumer, and using electronic tokens to carry out transactions such as purchasing goods and/or services at merchants. At the end of each transaction, the consumer reference code is deleted from the tokens used in the transaction and a reference code of the merchant who received the tokens in the transaction is stored in the electronic tokens.

8 Claims, 3 Drawing Sheets

(51) Int. Cl.
G06Q 20/34 (2012.01)
G06Q 20/38 (2012.01)

(56) References Cited

U.S. PATENT DOCUMENTS

| | | | |
|---|---|---|---|
| 2012/0271770 A1 | 10/2012 | Harris et al. | |
| 2013/0218763 A1* | 8/2013 | Wilkes | G06Q 30/0241 705/40 |
| 2017/0221050 A1* | 8/2017 | Jivraj | G06Q 20/3674 |
| 2017/0249622 A1* | 8/2017 | Ortiz | G06Q 20/387 |
| 2017/0364908 A1* | 12/2017 | Smith | G06Q 20/023 |
| 2018/0060860 A1* | 3/2018 | Tian | G06Q 20/401 |
| 2018/0241546 A1* | 8/2018 | Leng | G06Q 20/027 |
| 2018/0341942 A1* | 11/2018 | DeBates | G06Q 20/4014 |
| 2019/0028276 A1* | 1/2019 | Pierce | G06Q 20/02 |

OTHER PUBLICATIONS

International Search Report and Written Opinion For International Application No. PCT/IB2019/050559 (dated Apr. 25, 2019) (12 Pages).

Italian Search Report for Corresponding Italian Application No. IT 102018000001687 (2 Pages) (dated Jun. 26, 2018).

\* cited by examiner

PROCESS FOR CARRYING OUT TRANSACTIONS

CROSS-REFERENCE TO RELATED APPLICATIONS

This application is a 371 of PCT/IB2019/050559 filed Jan. 23, 2019, which claims the benefit of Italian Patent Application No. 102018000001687 filed Jan. 23, 2018.

FIELD OF THE INVENTION

The present invention concerns a process for carrying out transactions.

More in particular, the present invention concerns a process for carrying out transactions comprising the purchase of goods and/or services by using electronic tokens.

KNOWN PRIOR ART

Various payment systems in which no currency coins and/or banknotes are used, as payment is made electronically, for example by credit card or other electronic payment tools, are known.

However, these types of systems suffer from problems deriving from the possible loss and/or cloning of the credit card itself.

Supports similar to coins, such as tokens or similar, are also known and can be used to carry out transactions instead of currency coins and/or banknotes.

A token of this type is known by document US 2012/0055996.

Said document illustrates a token formed by a disc-shaped plastic support in which an RFID (Radio Frequency Identification) tag is provided to identify the single electronic token.

Also systems that allow the electronic management of electronic tokens provided with RFID tags are known.

For example, document WO 2013/177286 describes a system in which, for statistical purposes, electronic tokens in the form of gaming chips are individually read by readers at the gaming tables so that to track their use and to create, for example, customized reports for each gaming table or to anyhow collect detailed information on the flows of tokens inside the gaming house.

This system is however limited to being used in gaining houses.

Object of the present invention is to create a system that allows the possibility to safely make payments for goods and services and that can be used in the most diversified commercial contexts.

BRIEF SUMMARY OF THE INVENTION

This and further objectives are achieved by a process for carrying out transactions, wherein said process comprises at least the following steps:
issuing electronic tokens, wherein each of said electronic token issued is marked by a first unique identification code and by a monetary value;
assigning electronic tokens to a consumer, wherein a reference code associated with the consumer addressee of such an assignment is stored inside said electronic tokens;
using electronic tokens to carry out transactions comprising the purchase of goods and/or services at merchants; wherein
at the end of each transaction, the consumer reference code is deleted from the tokens used in the transaction and a reference code of the merchant who received the tokens in said transaction is stored in said electronic tokens.

An advantage of this solution is given by the fact that the consumer can know the amount of electronic tokens available to him at any time, without resorting to any device.

A second important advantage of the invention is given by the fact that the aforesaid transactions can be made also if no Internet connection is available.

Moreover, the electronic tokens are remotely reimbursable, i.e. also if they are not returned.

Finally, it should be noted that electronic tokens can be profiled on according to specific conditions, for example the validity date, type of rate, customized conditions (for example geographical, type of merchant), with possible corresponding colors or outer silk screens.

Further characteristics of the invention can be deduced from the dependent claims.

BRIEF DESCRIPTION OF THE FIGURES

Further characteristics and advantages of the invention will become clearer by reading the following description provided by way of example, and without limitations, with the aid of the figures shown in the accompanying tables, in which.

DETAILED DESCRIPTION OF SOME EMBODIMENTS OF THE PRESENT INVENTION

Figure 1:
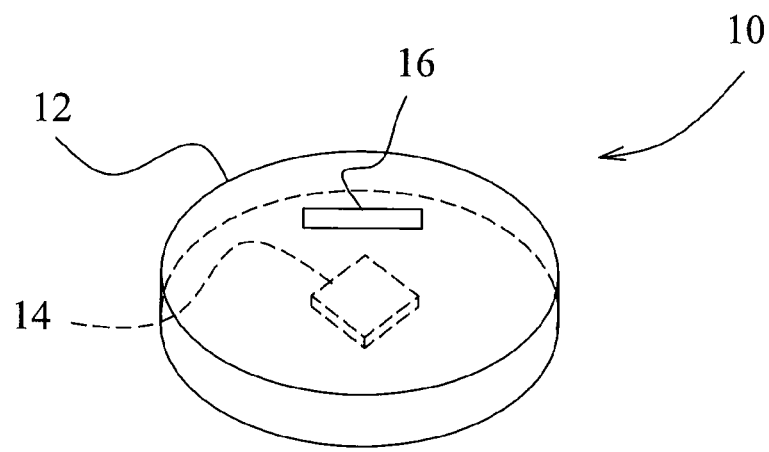
FIG. 1 is a schematic perspective view of an electronic token usable with the present invention.

First, with reference to FIG. 1, it is observed that the process of the invention can be carried out with the aid of electronic tokens, one of which is shown in FIG. 1 and denoted by the numerical reference 10 as a whole.

The electronic token 10 provides a support 12, for example disc-shaped, i.e. shaped like a coin or chip and made, for example, of plastic material, and which contains an electronic recognition device inside it, for example an RFID 14 (Radio-Frequency Identification) tag.

Inside, the device has a storage capacity of varying dimensions (from 64 Bytes to 2048 Bytes) which can be used to store the information useful for the operations of the invention.

As known, RFID technology allows said electronic tags to store the data and to also be able to respond to a remote interrogation of special fixed or portable readers.

In particular, in case of the present invention, each token 10 can be identified by a particular code that uniquely identifies it.

The identification code is unique and set up in the manufacturing step of the electronic token 10.

This identification code can also be recopied on the outside of the electronic token 10 in the form of bar code and/or sequence of numbers or letters 16.

In addition to this, the electronic token 10 can be associated to a monetary value, also stored, in a rewritable manner, on said tag 14 and/or recopied on the outside of the electronic token 10.

The process object of the present invention provides for the interaction of three main actors: the consumers, the merchants who adhere to the circuit in which the electronic tokens 10 can be spent and the issuer of the electronic tokens 10, and allows to use the electronic tokens 10 to pay for any good or service purchased by consumers at the merchants operating within a defined area, or basically at the merchants adhering to the payment circuit of the electronic tokens 10.

The payment can provide that a merchant, who supplies the good or service purchased by the consumer, simultaneously collects one or more electronic tokens 10.

Figure 2:
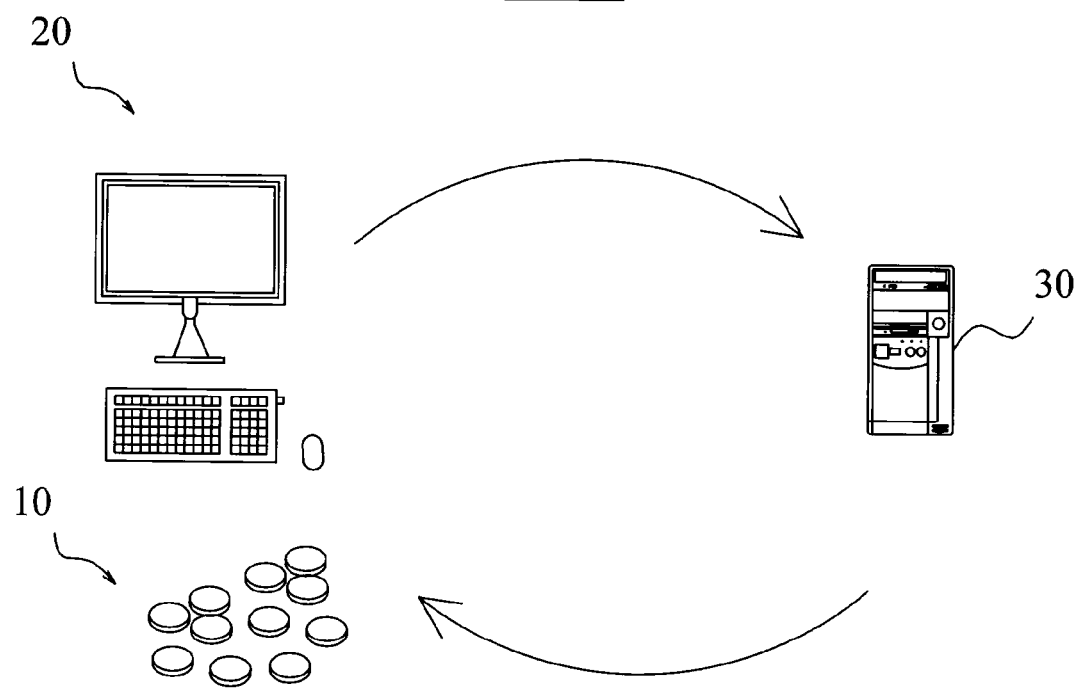
FIG. 2 is a schematic view of a step of the process of the invention.
Figure 3:
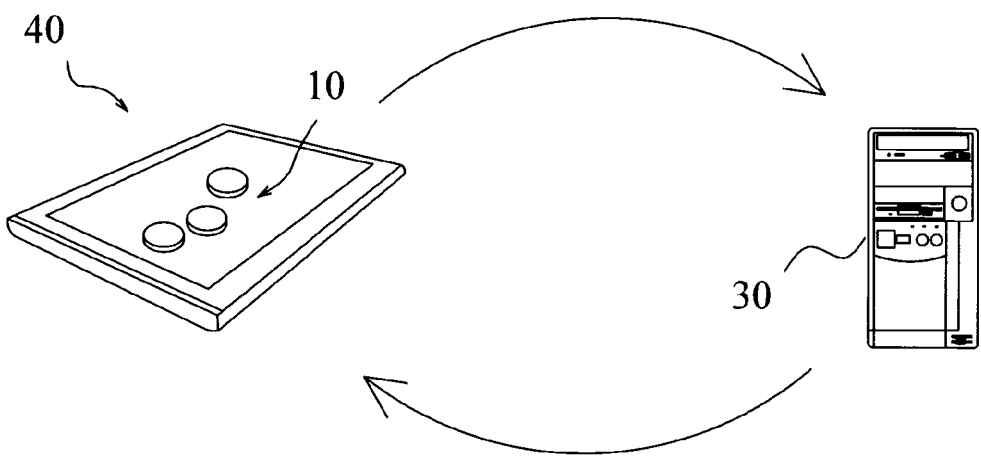
FIG. 3 is a schematic view of a further step of the process of the invention.
Figure 4:
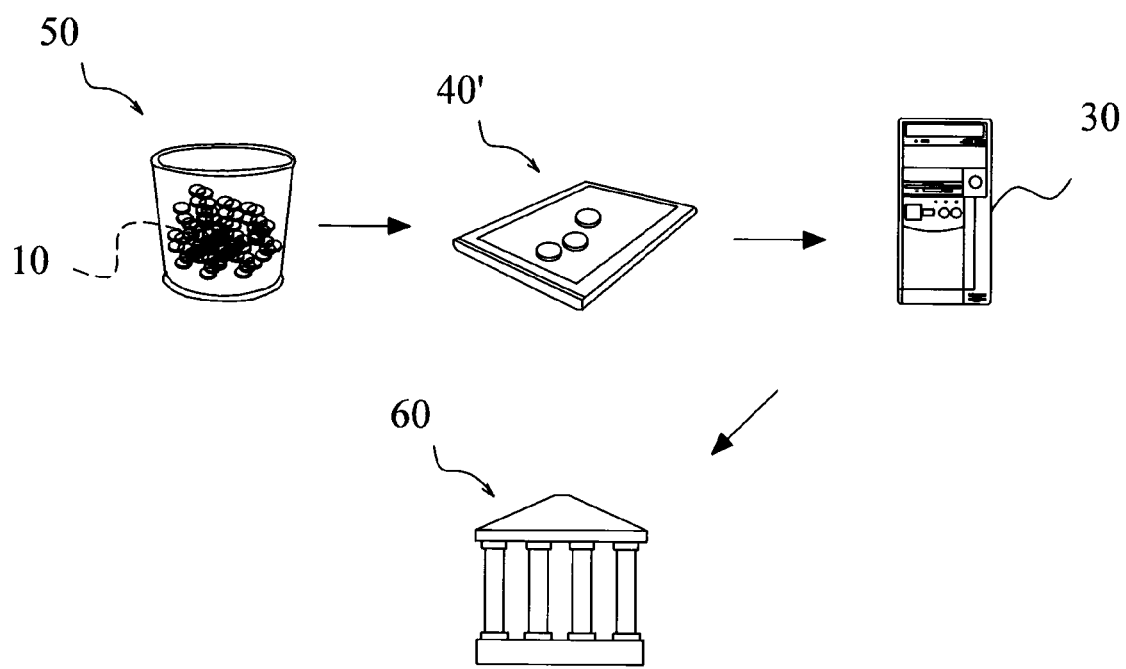
FIG. 4 is a schematic view of an another step of the process of the invention.

A consumer can connect to and use an online portal 20 in order to get the electronic tokens 10 and to decide the amount and type (FIG. 2) of electronic tokens 10 to purchase.

The term type intends to mean that the electronic token 10 can have different characteristics of use, for example relatively to the associated VAT rate, or to the use period or to specific promotions or also to different prices and monetary values.

Once the amount and type of electronic tokens 10 has been selected, the consumer makes the payment online, while a remote server 30 receives the electronic token 10 order and, once the effective payment thereof has been verified, proceeds with the concurrent sending of a relevant fiscal document containing an identification in the form of, for example, a bar code necessary for withdrawing the electronic tokens 10 at the place of the event or at the shopping center in which said electronic tokens 10 can be spent or, in general, at any seat of withdrawal predisposed by the token issuer.

During the distribution step of electronic tokens 10, the consumer therefore enters in possession of the electronic tokens 10 themselves. Normally, this occurs upon arriving at the place in which the electronic tokens 10 can be used (normally events, trade shows.), but the possibility that the electronic tokens 10 can also be sent to the consumer through the postal service or be otherwise delivered is not to be excluded.

The distribution or assignment of the electronic tokens 10 can be carried out according to two methods:

The first method occurs by receipt of the online payment.

The consumer submits or communicates the reservation code he received following the online reservation to the issuer and an operator of the issuer enters the codes through an optical reader, or manually, and a device automatically waits to read the electronic tokens 10 that must be distributed.

Once the electronic tokens 10 to be delivered to the consumer are automatically identified, a reference to the fiscal transaction carried out online is stored inside them— for example by writing the relevant information on the RFID 14 tag contained inside the token 10—and said electronic tokens 10 are delivered to the consumer.

This way, the tokens 10 so distributed contain a reference code associated with the consumer addressee of such assignment.

The second method occurs by direct payment.

The consumer goes to the distribution station and verbally communicates the amount and type of electronic tokens he wishes to purchase and pays the relevant price in cash or by means of other payment systems and the device automatically waits to read the electronic tokens 10 that must be distributed.

Once automatically identified, a reference to the fiscal transaction is stored inside them and they are then delivered to the consumer.

The consumer, who is in possession of the electronic tokens 10, can proceed with the purchase of goods and services within the dedicated area or payment circuit to which the merchants adheres to according to the following procedure:

The merchant sets the number and type of amount he expects to receive in electronic tokens from the consumer as payment for a given good or service and the consumer places the corresponding number of electronic tokens 10 on a reading device 40.

Subsequently, it is possible to proceed in two ways:

According to the first method, upon reaching the correct amount, the reader 40 provides to send the information related to the electronic tokens 30 placed on the reader 40 to a remote server 30.

This information comprises, for each token 10, the unique identification code and the monetary value of the token.

This way, the remote server 30 can provide to verify the validity of the electronic tokens 10 and to store the identification of the merchant who collected said electronic tokens 10, as well as the date and time of the transaction, inside them.

More in detail, the server 30 verifies the validity of the electronic tokens 10 in real time and displays the amount deposited, which must be subsequently validated by the operator.

The validation operation corresponds to storing the identification of the merchant who collects the electronic tokens 10, as well as the date and time of the transaction, inside them and to deleting the consumer reference code from the tokens used in the transaction.

At this point, the electronic tokens 10 are removed from the reading device 40 of the merchant and physically collected by the merchant in a container 50.

At this point, the electronic tokens 10 can no longer be used for any other transaction.

All transactions are also stored on the reading device 40 of the merchant and sent to a central server 30 in a telematic way.

The merchant can go to the central cash desk at any time to cash in the electronic tokens 10 collected.

The cashing in step consists in physically delivering all electronic tokens 10 collected which are placed on the reading device 40' of the issuer, who simultaneously provides to verify them and to verify that:

A. They are correctly associated with a transaction
B. They are not of an incorrect type
C. They are not virgin, i.e. never used
D. They are not counterfeit
E. They are valid at that time.

Once the aforesaid verifications have been carried out, the server 30 of the system provides to supply a report, also in paper form, of the collection which is communicated and delivered to the merchant.

Simultaneously, all of the information is stored on the reading device 40' of the issuer and sent, if possible, to a central server 30.

At this point, the electronic tokens 10 can be reactivated for being distributed again.

At the end of the event, the consumer could still be in possession of unused electronic tokens 10 for which he could request a reimbursement.

To this end, an online portal is set up to allow to obtain reimbursement for the unused electronic tokens 10 through the following procedure:

A. The consumer enters the identification code of the electronic tokens 10 in his possession B. The system verifies that:
 a. They are virgin, i.e. never used
 b. They are reimbursable at that time
 c. They were not stolen or declared lost C. A this point, the system requests the entry of the bank coordinates of the checking account on which to receive the amount to be reimbursed.

A charge, which will be subtracted from the total amount reimbursed, may be required in some cases.

In any case, fiscal documents of the reimbursement transaction will be issued.

The reservation portal is constituted by a website that allows to manage the sale of the electronic tokens 10.

It allows to enter and process the data necessary for the sales operation, among which:
 a. User profiling
 b. Issuance of the fiscal documents.

The distribution apparatus of the tokens 10 is normally a unique device inside which an electronic processor, a double-sided LCD/LED display and an RFID reader plate of varying dimensions and technology, are contained to read the electronic tokens.

This device is normally associated with a cash register and a bar code reader to read the reservation receipts.

With reference to the type of configuration, the device could be provided with a small keyboard for entering the amounts or validating the electronic tokens.

In other configurations, it could also be provided with an SD reader or HSDPA/LTE connection router.

The payment apparatus is normally a unique device inside which an electronic processor, a double-sided LCD/LED display and an RFID reader plate of varying dimensions and technology are contained to read the electronic tokens.

With reference to the type of configuration, the device could be provided with a small keyboard for entering the amounts or validating the electronic tokens.

In other configurations, it could also be provided with an SD reader or HSDPA/LTE connection router.

The cashing in apparatus is normally a unique device inside which an electronic processor, a double-sided LCD/LED display and an RFID reader plate of varying dimensions and technology are contained to read the electronic tokens.

With reference to the type of configuration, the device could be provided with a small keyboard for entering the amounts or validating the electronic tokens.

In other configurations, it could also be provided with an SD reader or HSDPA/LTE connection router.

The reimbursement portal could be constituted by a website in which the reimbursement service is developed by entering the identification codes of the electronic tokens and bank data for the sending of the money.

The central server constitutes the main data collection hub of all devices involved in the operations of the service.

All the information of each transaction carried out is stored inside this device.

Figure 5:
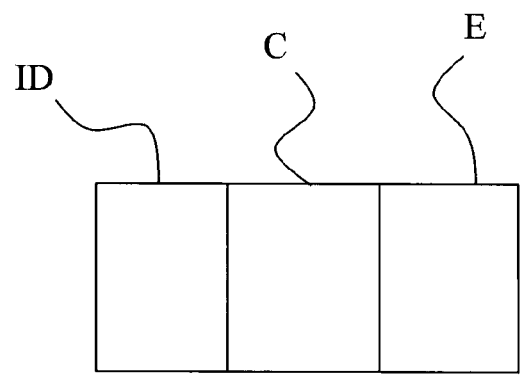
FIG. 5 is a schematic view of a storage configuration of the electronic token.

FIG. 5 is a schematic view of an electronic token storage configuration in which the ID storage area containing the unique identification code of the token 10, the storage area C containing the consumer reference code (deletable and rewritable) and the storage area E containing the merchant reference code are depicted.

Figure 6:
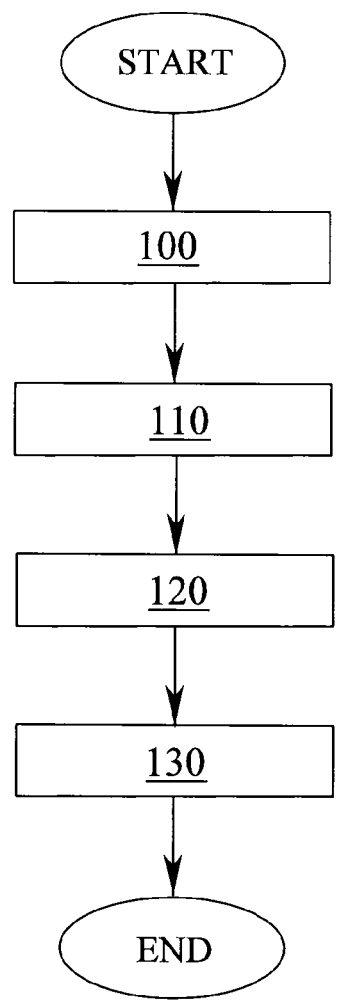
FIG. 6 is a block diagram of the main steps of the process of the invention.

FIG. 6 is a block diagram that summarizes the main steps of the process of the invention.

A first step (block 100) comprises issuing electronic tokens, wherein each of the electronic token issued is marked by a first unique identification code and by a monetary value.

A second step (block 110) comprises assigning electronic tokens to a consumer, wherein a reference code associated with the consumer addressee of such an assignment is stored inside said electronic tokens.

A third step (block 120) provides for using the electronic tokens to carry out transactions comprising the purchase of goods and/or services at merchants.

Finally (block 130), at the end of each transaction, the consumer reference code is deleted from the tokens used in the transaction and a reference code of the merchant who received the tokens in the transaction is stored in the electronic tokens.

Obviously, modifications or improvements may be added to the invention as described as a result of contingent or particular motivations, but without deviating from the scope of the invention claimed hereunder.

The invention claimed is:

1. A process for carrying out transactions, wherein said process comprises:
 issuing electronic tokens, wherein each of said electronic tokens is marked by a first unique identification code and a monetary value;
 assigning the electronic tokens to a consumer, wherein a consumer reference code associated with the consumer is stored inside said electronic tokens;
 using the electronic tokens to carry out a transaction comprising a purchase of goods and/or services at merchants; wherein
 at the end of the transaction, the consumer reference code is deleted from the electronic tokens used in the transaction and, in said electronic tokens, a merchant reference code of a merchant who received the electronic tokens in said transaction is stored.

2. The process according to claim 1, wherein in the electronic tokens used in the transaction, the merchant reference code is deleted by a cashing-in apparatus on payment to the merchant of the monetary value of the aforesaid electronic tokens.

3. The process according to claim 1, wherein the step of assigning the electronic tokens to a consumer happens by using a reservation code, which allows detection of the electronic tokens to be assigned to the consumer, or by direct payment at a token issuer, to which the storing on each electronic token of the reference code associated with the consumer follows.

4. The process according to claim 1, wherein the step of carrying out the transaction which comprises the purchase of goods and/or services at a merchant happens by use of a payment apparatus, which records the number and the type of the electronic tokens and stores data and time of the transaction, as well as it provides for deleting the consumer reference code from the electronic tokens used in the transaction and the contextual writing of the merchant reference code on the electronic tokens.

5. The process according to the claim 1, wherein use of electronic token delivering apparatuses, payment apparatuses and token cashing-in apparatuses is provided, wherein each of said apparatuses comprises a computer, a double-sided LCD/LED display and a RFID reader plate to read the electronic tokens.

6. The process according to claim 5, wherein the aforesaid apparatuses are provided with a keyboard for inputting the monetary value or validating the electronic tokens.

7. The process according to claim 5, wherein the aforesaid apparatuses are provided with an SD reader or an HSDP/LTE connection router.

8. The electronic token designed to be used in the process according to claim 1, wherein said electronic tokens comprise a solid medium containing an electronic recognition device able to be read and rewritten electronically, as well as a permanent memory for storing unique identification code of the electronic token and for temporarily storing consumer and merchant reference codes using said electronic tokens.

* * * * *